Feb. 17, 1931. T. L. FAWICK 1,792,484
TRANSMISSION
Original Filed Dec. 14, 1925   2 Sheets-Sheet 2

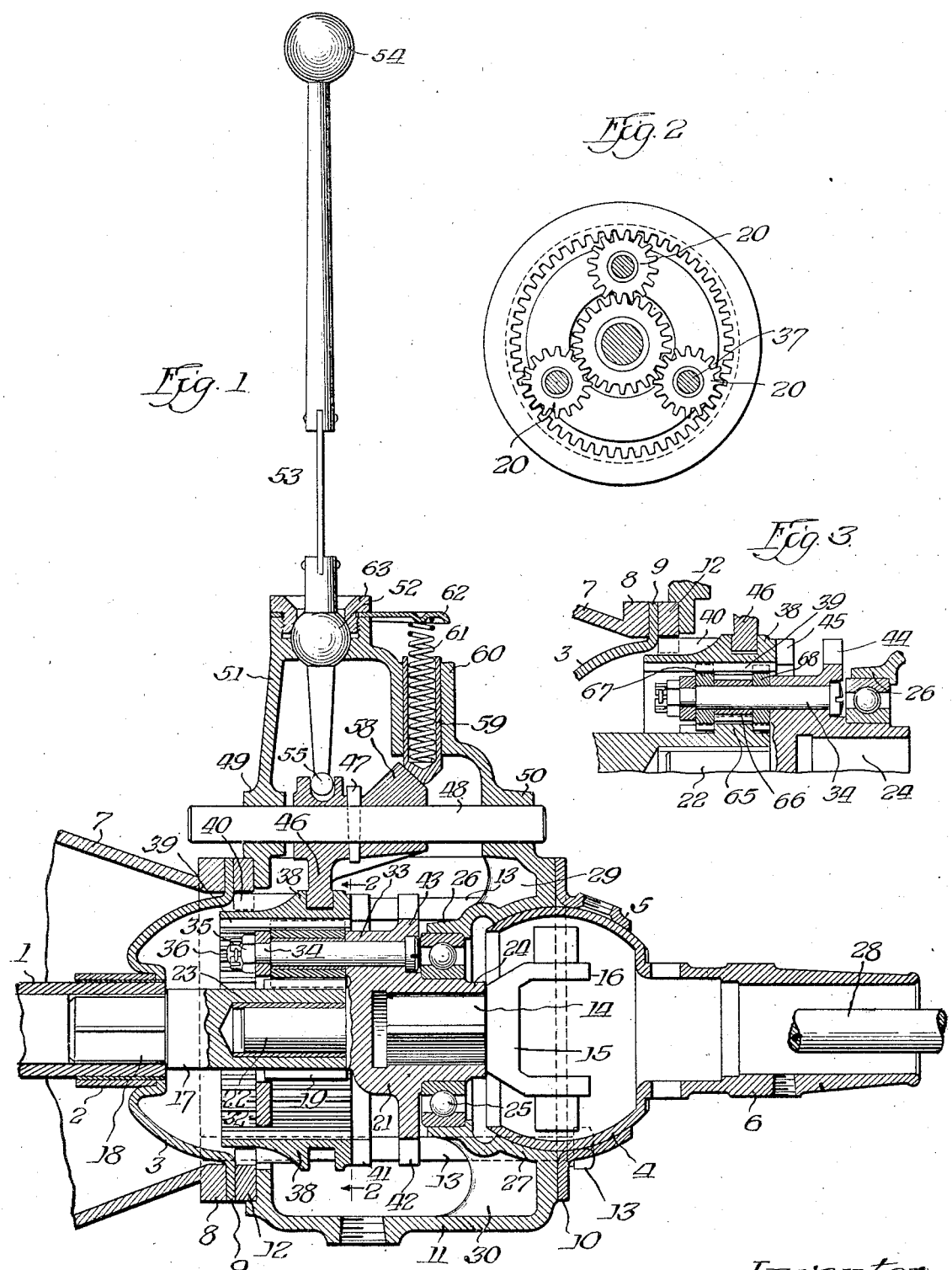

Inventor
Thomas L. Fawick

Patented Feb. 17, 1931

1,792,484

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

TRANSMISSION

Application filed December 14, 1925, Serial No. 75,194. Renewed May 28, 1928.

My invention relates to transmissions, particularly to such as are employed between the usual accelerating and reverse gear box of an automobile and the propeller shaft of the same for giving a lower or a higher rear axle speed.

The present invention in that respect discloses an improvement upon the device disclosed and claimed in my prior patent No. 1,524,476.

While the invention is peculiarly adapted to use in connection with the usual accelerating and reverse transmission, it may appear in an independent transmission or a transmission for general use, such for example, as for motor cars, trucks, power boats, either alone or in combination with other means.

The preferred form of the present invention is designed to secure the same general results which I secured in my prior Patent No. 1,495,782, but in the present structure, instead of shifting the internal gear and pinion laterally with respect to each other, as disclosed in said latter patent, I now arrange to shift the internal gear axially to secure the desired change in driving ratio.

This construction permits of a simple and inexpensive structure of small dimensions and low cost, and it permits the main driving units to remain definitely in alignment and all gears to be in mesh at all times. It also permits of a straight line motion of the shifting member.

The present structure is in some respects also an improvement upon my transmission disclosed in co-pending Case 17, in which I maintain the main driving shaft in fixed relation and selectively slide the driving pinion for securing the change of gear ratio, in that case the motion of shifting being a straight line movement of the pinion and the shifting lever.

The present transmission is economical in construction in that the internal gear does not require an indepedent bearing being supported upon three idler pinions, which, in turn, are supported on a cage connected to to the intermediate shaft section or to the driven shaft, as the case may be.

While I term this member to which the idler pinions are connected an "intermediate shaft section", it is, in reality, only the front end of the propeller shaft suitably mounted for rotation in the housing. Since it does not have any motion independent of the propeller shaft, it may be supported in a single anti-friction bearing in the housing and piloted in the pinion shaft, which pinion shaft is, in reality, merely an extension of the final drive shaft of the usual accelerating and reverse transmission or of the driving shaft.

While I have shown the preferred embodiment of the invention as applied to the Ford automobile, as at present constructed, and have shown a reducing gear, it is to be understoood that the invention is not to be limited to the particular type of automobile, nor to reducing gearing, nor to the details which I have elected herein to illustrate the invention.

In order to acquaint those skilled in the art with the manner of constructing and operating a device embodying the invention, I shall now describe a specific form of the same.

In the drawings:—

Fig. 1 is a longitudinal cross-section of a transmission embodying my invention secured in place upon the rear end of the Ford transmission housing and connected to the forward end of the Ford torque tube and propeller shaft;

Fig. 2 is a cross-sectional view taken on the line 2—2 of Fig. 1;

Fig. 3 is a fragmentary section illustrating a modified form of clutching means for clutching the internal gear to the driven shaft.

Figure 4:
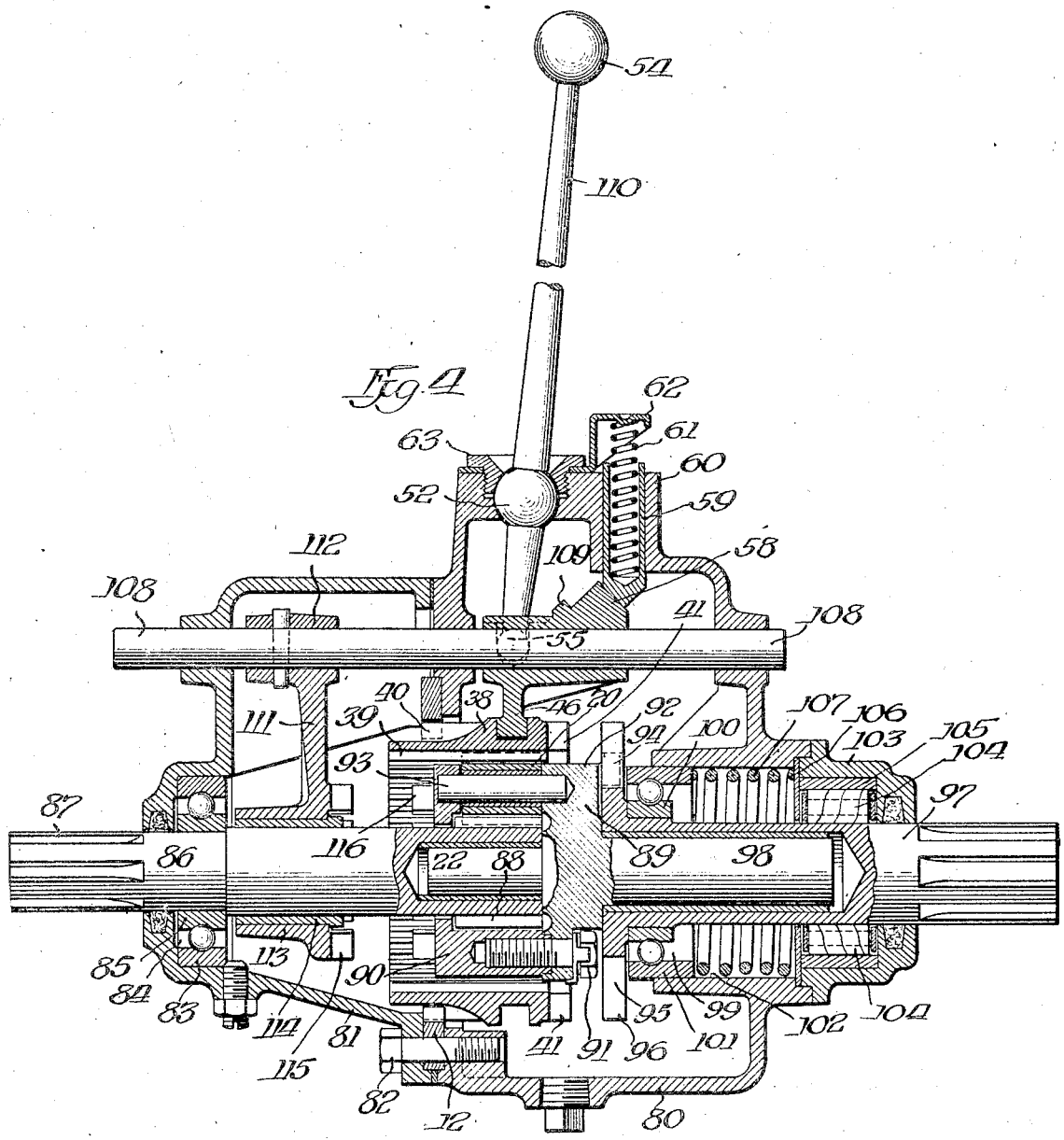
Fig. 4 is a longitudinal vertical section through a modified embodiment providing two speeds and reverse.

For the sake of clearness, I have not illustrated the Ford accelerating and reverse transmission which is of the usual planetary type and which includes, first, a main clutch, and, next, the planetary gears with their clutches for performing the usual function of disconnecting the engine from the propeller shaft and for connecting the engine and propeller shaft either directly for a straight 1 to 1 drive or through the planetary gears at a reduced drive. The final driving shaft from the Ford transmission is shown at 1. It has a bearing at 2 at its rearmost end, this bearing 2 being supported in a semispherical shell member 3 which is normally employed in the Ford automobile for housing the forward spherical end 4 of the torque tube, the spherical retaining ring 5 which embraces the rear spherical portion of the forward end 4 of the torque tube 6 normally holding said spherical end 4 in the shell 3 when my transmission is not employed. I make use of these parts in the position shown, as will be more clear from the following description:—

The rear end of the transmission housing is illustrated at 7. It has a bolting flange at 8 for receiving suitable bolts 13 which pass through the flanges 9 and 10 of the parts 3 and 5 and also through the case 11. In the construction of the Ford automobile as modified by my transmission, I interpose between the flanges 9 and 10 a suitable frame member 11, which is formed into a closed housing preferably, but not necessarily, all cast in one piece and a clutch ring 12, these parts being all secured together by means of four or more through bolts 13 which hold these parts together.

The rear end of the driving shaft 1 has a square socket which normally receives the square stud 14 of the forward half 15 of the universal joint 16, part of which has been omitted for the sake of clearness. I provide a pinion shaft 17 which has a squared end 18 adapted to enter the socket in the end of the driving shaft 1. This pinion shaft bears an integral pinion 19 thereupon which meshes with three idler pinions 20 supported in a cage which is formed, in part, of the intermediate shaft section or driven member 21. The cage, instead of being built up as shown, may be made of a solid block or forging, and the pinions, instead of being tubular, may be integral with their shafts which then bear in the cage ends. This driven member 21 has a forwardly projecting bearing stud 22 which is piloted in the adjacent end of the pinion shaft 17, a suitable bronze sleeve 23, or the like, being provided for the bearing for said stud 22 in the shaft 17. At its rear end the driven member 21 has a squared socket 24 for receiving the squared stud 14 of the forward half of the universal joint 16. Externally of the socket member 24 I provide the ball bearings 25, said bearings having an inner ring seated upon the outside of the socket member 24 and an outer ring seated inside of a bearing flange 26, which bearing flange is an integral part of the housing 11. Back of the bearing flange 26 the housing has the spherical seat 27 for receiving the forward part of the spherical head 4. The propeller shaft 28 is connected to the universal joint 16 in the well known manner, this connection being omitted for the sake of clearness. Strengthening ribs, as indicated at 29 and 30, are formed in the housing 11 to assist in supporting the bearing flange 26 since this bearing 25 forms the main bearing of this transmission. In fact, in the present construction, it is possible to secure a satisfactory structure and operation with the single anti-friction bearing 25. I use spherical bearing members in order to take care of the end thrust, which end thrust is always to the right, as viewed in Fig. 1 because of the action of the clutch spring in the Ford transmission. The idler cage to which I have heretofore referred, is formed between the ring 32 and three bosses 33 formed on the driven member 21 with posts or pillars connecting the two formed by the shouldered bolts 34. These bolts are introduced through the rear of the bosses 33 and project into the ring 32, being held firmly in place with castellated nuts 35 held with cotter pins 36. These bolts 34 have finished bearing surfaces for receiving the pinions 20, anti-friction bearing sleeves 37 of bronze or the like lying between the pinions and the bolts to provide suitable wearing surfaces.

The internal gear 38 has internal teeth 39 constantly in mesh with the idler pinions 20, and the said gear 38 is of a length suitable to permit the same to be moved axially with respect to the idlers 20 without losing mesh with the same.

The ring gear 38 has upon its outside and adjacent the left end, as viewed in Fig. 1, a series of clutch teeth 40 cooperating with the teeth of the internal clutch ring 12 above referred to. At the opposite end of the internal gear 38 I provide clutch teeth 41 which are adapted to cooperate with the clutch teeth 42 on the driven member 21. These clutch teeth 42 project out radially on a flange 43 formed on the rear end of the driven member 21.

The internal gear 38 is adapted to be shifted axially through the medium of a suitable shifter fork 46, which shifter fork is secured as by means of the pin 47 to the plunger shaft 48 which slides in suitable guides formed by holes drilled in the bosses 49 and 50 in the base of an extension 51 of the housing 11. This extension 51 at its upper end has a seat for the spherical bearing 52 formed on the intermediate part of the shifter lever 53. The upper end of the shifter lever 53 carries a suitable knob 54 and the lower arm of the shifter lever below the bearing 52 has a rounded knob or extremity 55 which projects into an opening or groove in the hub of the shifter fork 46. The hub of the shifter fork 46 is extended laterally to the right, as viewed in Fig. 1, to provide the cam member 58 for cooperation with the spring plunger 59 to give a snap motion of the shifter and internal gear 38 from one extreme position to the other. The construction of the snap mechanism and the construction of the shifter mechanism may be varied without departing from my invention.

It is to be noted that there is no tendency through the transmission of power through the internal gear 38 to shift it endwise and, hence, a relatively light spring pressure is all that is required to hold it in either clutched position. The lower end of the plunger 59 is wedge-shaped to cooperate with the wedge-shaped cam 58 so that the shifter readily snaps from one position to the other. The plunger 59 is preferably rectangular in cross-section and seats in a hole broached in the boss 60 of the outward extension 51. The plunger 59 is bored out to receive the compression spring 61, the upper end of which abuts against a bracket plate 62, this bracket plate being held in position by the threaded retaining ring 63 which retains the spherical bearing 52 of the shifter lever 53 in its seat.

It is believed that the operation of the device shown in Fig. 1 will be apparent from the foregoing detailed description.

Assume that the parts are in the position shown in Fig. 1 and that the internal gear 38 is clutched to the clutch ring 12, the drive from the driving shaft 1 and its continuation 17 proceeds through the pinion 19 and through the idlers 22 which roll forward in the same direction as the pinion 19, their outer peripheries rolling inside of the internal gear 38 and pushing the cage and, hence, the driven member 21 around in the same direction as the movement of the shaft 1, but at reduced speed.

In this connection I wish to call attention to the fact that the speed ratio between the driving shaft 1 and the propeller shaft 28 may be controlled by having the pinion 19 work on a different part of the idlers from that part which rolls on the inside of the internal gear 38, said different parts being of different diameters. In such manner, the ratio of speed between the driving shaft 1 and the driven shaft 28, or the driven shaft section 21, may be made different from the fixed ratio of 3.77 which the present device exhibits, using a ring gear of 51 teeth, idlers of 12 teeth, and a driving pinion of 27 teeth.

I have shown in Fig. 3 how the pinion 65 may be modified to cooperate with the section 66 of reduced diameter, whereas, the internal gear 38 meshes with the sections 67 and 68 of enlarged diameter, these sections 66, 67 and 68 being, however, all connected together in a unitary manner.

Thus, assuming that the internal gear member 38 is held stationary by the clutch teeth 40, the drive proceeds from the driving pinion through the idlers, to the cage and, thence, to the driven member and to the propeller shaft 28 through the universal joint. If it is desired to drive the propeller shaft 28 at the speed of the driving shaft 1, then the lever 53 is pushed forward compressing the spring 60 during that part of the motion of the mechanism which disengages the teeth 40 from the stationary clutch ring 12, and immediately after these teeth have disengaged, the spring pressed plunger 59 operates on the other side of the cam 58 to cause the internal gear member 38 to snap over to the right, as viewed in Fig. 1, to engage the clutch teeth 41 and 42 for direct drive from the shaft 1 to the driven section 21.

Clutching of the teeth 41 and 42 clutches the pinions 20 to the cage and prevents rotation of said pinions on their bearings 37, the effect being clutching of the driving member to the driven member so that direct drive through the transmission results.

In Fig. 4 I have shown an independent transmission such as may be used in connection with power boats or the like, for giving two speeds forward and one speed reverse in a simple unitary structure which may be employed for general use, or which may be employed in combination with the auxiliary transmission of my invention shown in Patent No. 1,495,782. The casing is formed of a main part 80 and a supplemental part 81, the clutch ring 40 being secured between the two casings and held in place by the cap screws 82 which join said casing sections. The forward section 81 mounts the outer race 83 of a ball bearing 84, the inner race 85 thereof being mounted upon the drift shaft 86. The drive shaft 86 is splined at its forward end 87 to be coupled to a driving flange or the like, which flange has been omitted for the sake of clearness. Preferably, a threaded stud is formed on the extreme forward end of the shaft to hold the driving flange in place, as is well known in the art, such flange also permitting motion of the shaft 86 axially to the right as viewed in Fig. 4.

A driving shaft 86 has a pinion 88 formed integral therewith, and the end of the shaft is bored out to receive the pilot stud 22 of the driven member 89. The driven member 89 has the cage 90 secured thereto by three or more cap screws 91 which hold the cage to a flange formed on said member 89. Three pinions 20 which form idlers between the driving pinion 88 and the internal ring gear 38, are mounted upon studs or shafts 93 which thereby form a part of the pinion cage. The cage may thus be considered as a separate part secured to the driven member 89, or it may be considered as a part of the driven member 89, since the effect in either event is the same. The driven member 89 has a series of clutch teeth 94 normally seating in notches 95 formed in the flange 96 of the driven shaft section 97. This driven shaft section 97 is bored out to provide a pilot bearing for the stud 98 which forms a part of the driven member 89. The flange member 96 also has continuations of the slots or notches 95 forming teeth for receiving the dog clutch members 41 formed on the right hand side of the internal or ring gear 38. When the parts are in the position shown in Fig. 4, the flange 96 is functionally a part of the cage, being held in engagement therewith through the dogs 94 engaging in slots 95 and being held in such engagement by spring 107. The outer parts of the flange 96 and the outer ends of the slots 95 thereby become functionally the same as the flange 43, and slots or dogs 42 in the embodiment of Fig. 1 with the added capability of ready disconnection for the reverse gear drive. Suitable anti-friction liners are provided between the bearing studs 22 and 98 and their respective sockets. The driven shaft section 97 is mounted in the section 80 of the housing by a movable ball bearing 99 at its forward or left end, as viewed in Fig. 4, the inner race 100 being supported at the junction of the flange 96 in the main part of the shaft 97, and the outer race 101 being mounted in a cylindrical bore 102 formed in the rear part of the housing section 80. This bore is closed by a cap member 103 in which there is mounted the Hyatt roller bearings 104, the outer race 105 of which is held in place in said cap 103 by a plate 106 held in place between the shoulders in the hollow bore 102 and the cap 103. This roller bearing 104 permits endwise motion of the shaft section 97.

The outer race member 101 is engaged by a helical spring 107 which is mounted in the bore 102, and this spring pushing against the outer race member which is slidable in the bore 102 holds the driven shaft section 97 to the left, as viewed in Fig. 1, keeping the clutch recesses 95 in engagement with the jaws 94 on the driven shaft section 89 to hold these parts together for low speed drive at which time the flange 96 and slots or jaws 95 are functionally a part of the cage. The ring gear 38 floats freely on the idlers in the cage 90 and, hence, requires no bearing. It has the dog clutch teeth 41 at the right hand end to engage in the clutch teeth 95 in the flange 96 and it has the clutch teeth on the left hand end for engaging the stationary clutch teeth 40 in the ring 12. This ring gear 38 may be shifted by means of the shifter fork 46 which is mounted on the sliding rod 109. A shifter fork 46 has a suitable hub providing the cam 58 engaged by a spring plunger 59. A supplemental cam 109 is provided on the hub of the shifter fork 46, this shifter fork being keyed to the shaft 108 and having a recess for receiving the lower end 55 of the operating handle 110, which may be constructed as shown in Fig. 1. The shifter rod 108 has a supplemental clutch member 111 connected to the left hand end of the same, as viewed in Fig. 4, this clutch member 111 comprising a hub member 112 keyed or pinned to the shaft 108, and a sleeve member 113 having a bearing upon a shaft 86 through a suitable bearing liner 114. At its right hand face, as viewed in Fig. 4, the sleeve member 113 has a series of clutch jaws 115 for cooperation with the clutch jaws 116 formed on the cage 90.

The operation of the device will now be described. Assuming that the parts are in the condition shown in Fig. 4 and the teeth 40 are clutched to the stationary ring 12 which, in turn, is supported on the housing, drive from the shaft 86 through the pinion 88, rotate the idlers inside of the ring gear 38 which is stationary, driving the driven shaft section 89 and its connected driven shaft 97 at a reduced rate of speed.

When the shifter handle 110 is shifted forward, it first disengages the clutch teeth 40 on the ring gear 38 and next clutches the teeth 41 with the recesses 95 formed in the flange member 96 of the driven shaft 97, thereby clutching the pinions to the driven shaft section, since the driven member 89 and the driven shaft section 97 are clutched together at the teeth 94. Thus the idlers 20, the ring gear 38, the driven section 89 and the shaft 97, are all clutched together solidly and rotate in unison, the drive proceeding from the shaft 86 straight through to the shaft 97.

If, now, the handle 110 is pushed further to the left, as viewed in Fig. 4, the flange 96 is pushed to the right by the pressure of the ring gear 38, compressing the spring 107 and disengaging the clutch teeth 94 on the driven member 89 from the notches 95 in the flange 96, thereby passing through a neutral position. Further movement then engages the clutch teeth 115 with the teeth 116 on the cage 90, thereby holding said cage 90 stationary and causing the drive to proceed from the shaft 86 to the pinion 88 through the idlers 20, ring gear 38, and since the ring gear is clutched to the driven shaft 97, the drive proceeds to the driven shaft 97.

In this manner, two speeds forward and one reverse, may be secured in this transmission.

I may embody this transmission in an automobile drive, particularly by connecting the driven shaft 97 through the internal gear and pinion transmission of my Patent No. 1,495,782, to give a resulting transmission which has four speeds forward and two reverse.

It will be apparent to those skilled in the art that the invention may be embodied in other forms and with considerable variation in detail, all without departing from my invention.

I claim:—

1. In a transmission, a frame forming a housing, a pinion shaft having a driving pinion and projecting into one end of the housing, a propeller shaft projecting into the other end of the housing, an intermediate shaft section having a bearing on said housing independent of the pinion shaft, a pinion cage secured to said shaft section, a plurality of idler pinions mounted in said cage and meshing with the driving pinion, an internal gear embracing said idler pinion and being axially slidable, and means for clutching said internal gear to said frame in one position and to said cage in another position.

2. In combination, a shaft having a pinion, an intermediate member having a cage, and a second shaft having a clutch member, said intermediate member being piloted in one of said shafts, clutch means between the intermediate member and the clutch member of the final shaft, idlers carried by the intermediate member, a ring gear embracing the idlers, means for holding the intermediate member stationary, and clutch means on the ring gear for engaging the clutch member.

3. In combination, a first shaft, an intermediate member, a second shaft, a pinion cage connected to the intermediate member, a series of pinions in said cage, a driving pinion on the first shaft, a ring gear connected with the idler pinions, clutch means on the intermediate member, a cooperating clutch member on the second shaft, clutch means on the ring gear for engaging the clutch member and for disengaging the clutch member from the clutch means of the intermediate member.

4. In combination, a first shaft, a second shaft, an intermediate member piloted in the second shaft and having an idler cage, idlers in said cage, a pinion on the first shaft meshing with said idlers, a ring gear meshing with the idlers, a clutch member on the second shaft, clutch means on the intermediate member, said ring gear having means for engaging the clutch member and for disengaging it from the clutch means.

5. In combination, a first shaft, a second shaft, an intermediate member piloted in the second shaft and having an idler cage, idlers in said cage, a pinion on the first shaft meshing with said idlers, a ring gear meshing with the idlers, a clutch member on the second shaft, clutch means on the intermediate member, said ring gear having means for engaging the clutch member and for disengaging it from the clutch means, said cage having clutch means independently of the first clutch means, and a non-rotatable clutch for engaging said latter clutch means.

6. In combination, a housing, a first shaft in the housing, a second shaft in the housing, an intermediate shaft axially aligned with the first and second shafts and in telescopic relation with one of them, an idler cage connected to the intermediate shaft, a series of idlers in the cage, a driving pinion meshing with the idler and held by the cage against axial movement, a ring gear supported solely on and embracing the idlers, and clutch means for holding the ring gear stationary or for holding the cage stationary.

7. In combination, a housing, a first shaft section and a second shaft section having bearings in the housing, an intermediate shaft section in alignment with said first and second shaft sections, a pinion on the first shaft section, a cage connected to the intermediate shaft section and having clutch means normally connecting it to the second shaft section, idlers on the cage meshing with the pinion on the first shaft section, an internal gear meshing with the idlers, and means for clutching the internal gear to the second shaft section and for disconnecting the second shaft section from the intermediate shaft section.

8. In combination, a first shaft section, a second shaft section, a housing having bearings for said shaft sections, an intermediate shaft section in alignment with the first shaft section, an idler connected to the intermediate shaft section, an internal ring gear meshing with the idler, means for clutching the ring gear to the housing, means for holding the idler against rotation, means normally connecting the intermediate shaft section with the second shaft section, and means operated by movement of the ring gear for disconnecting said intermediate shaft section from the second shaft section.

9. In combination, a cage having idlers, a first shaft section, a second shaft section spaced from and in endwise alignment with the first shaft section, the first shaft section having a pinion meshing with the idlers, said first shaft section being mounted against endwise movement with respect to the cage, the second shaft section being mounted for axial movement with respect to the cage, spring means for holding the second shaft section in a predetermined position, clutch means between the cage and the second shaft section held in operative engagement under the action of said spring holding means, said second shaft section being movable endwise against the spring means to disengage said clutch means, and an internal gear meshing with the idlers and connectible to the second shaft section and to the cage.

10. In combination, a housing, a first shaft section having a bearing in the housing, a cage having idlers, a pinion on the first shaft meshing with the idlers, a second shaft section mounted in the housing spaced from and in endwise alignment with the first shaft section, said second shaft section having a bearing in the housing permitting endwise movement of the second shaft section, clutch means between the cage and the second shaft section, means for holding said clutch members in engagement, an internal gear mounted on the idlers and having clutch means cooperating with the clutch means on the second shaft section, and means for moving the internal gear to clutch it to the second shaft section and to disengage the clutch members and means simultaneously cooperating to prevent rotation of the cage.

11. In combination, a cage having idlers, a first shaft section having a pinion meshing with the idlers, a ring gear embracing and meshing with the idlers, a second shaft section, clutch means between the cage and the second shaft section, said second shaft section being axially movable to control said clutch means, and means for moving the ring gear to shift the second shaft section axially to control the aforesaid clutch means.

12. In combination, a cage having idlers, a first shaft section having a pinion meshing with the idlers, a second shaft section axially spaced from and aligned with the first shaft section, an internal gear embracing and meshing with the idlers, a clutch element for holding the cage against rotation, means for clutching the internal gear to the second shaft section, and common means for operating the clutch element and said latter clutch means, said common means including said internal gear.

13. In combination, a cage, idlers mounted in the cage, a first shaft section having a pinion meshing with the idlers, a second shaft section, an internal gear meshing with the idlers, and means for selectively clutching the second shaft section to either the cage or to the internal gear or to both, and means for holding the cage when the second shaft section is clutched to the internal gear only.

14. In combination, a frame, a driving shaft and a cage journaled on said frame, a pinion for the driving shaft, a plurality of planet gears mounted in said cage and meshing with the pinion, clutch dogs rotatable with the cage, an internal ring gear mounted on said pinion and shiftable axially, a clutch ring mounted on said frame and lying outside of the ring gear, said ring having inwardly projecting clutch dogs, said ring gear having external clutch dogs on its outer periphery for engaging the dogs of said clutch ring, and having clutch dogs for cooperation with the clutch dogs of the cage.

15. In combination, a gear case having a flange adjacent one end, a clutch ring secured to said flange, said ring having inwardly projecting clutch dogs, a shaft projecting into said case, a pinion on said shaft, a cage coaxial with the shaft, planet gears in said cage, a flange member with radially projecting clutch dogs rotatable with the cage, a ring gear mounted on said planet gears and axially movable with respect to the same, said ring gear having clutch dogs lying on the outside periphery thereof for cooperation with said dogs on the clutch ring, and having clutch dogs on one end thereof and lying outside the gear teeth thereof for cooperation with the teeth on the flange member.

16. In a device of the class described, the combination of a housing, an axially slidable shifter rod mounted in said housing, a fork connected to said rod, a cam member mounted on said rod, a spring pressed follower cooperating with said cam to bias the rod and its shifter fork into either of two extreme positions, a first shaft section, a second shaft section, a cage, a pinion on the first shaft section, said cage having a plurality of planet gears meshing with the pinion, an internal gear meshing with and mounted on said planet gears, said internal gear having an external groove for receiving said shifter fork, clutch means on said internal gear for clutching the same to the housing or to said cage in different positions thereof.

17. In combination, a driving shaft, a driven shaft, an intermediate pinion carrier, planet idler pinions supported by said carrier, an external gear member surrounded by and meshing with said idlers, an internal gear member surrounding said idlers and meshing therewith, a pair of housing parts, a stationary clutch ring clamped between said housing parts and having inwardly extending radial clutch teeth, clutch means on the pinion carrier, one of said gear members having constant driving connection with the driving shaft for imparting the drive therefrom, means for clutching the other of said gear members to said stationary clutch ring for a change of speed drive from the driving shaft to the driven shaft through the intermediacy of the other gear member and said planet pinions and for clutching said gear member to the planet pinion carrier for direct drive between said shafts and means fulcrumed for swinging movement on one of one housing parts and operable to impart axial sliding movement to said clutch means.

18. In combination, a driving shaft, a driving pinion thereon, a driven shaft, a cage about the driving pinion having idlers meshing with the pinion, an internal gear meshing with the idlers, a common clutch element on the driven shaft and movable into positions for clutching either the cage or the internal gear, or both, and control means for the gear and clutch element.

19. In combination, a driving shaft, a driving pinion thereon, a slidable driven shaft member in line with the driving shaft, a cage about the driving pinion having idlers therein meshing with the driving pinion, an internal gear member meshing with said idlers, clutch means on said slidable driven shaft section, on the cage, and on the internal gear, respectively, and control means for clutching the clutch means on the driven shaft section to either the cage or the internal gear, or both.

20. In combination, a frame, a driving shaft and a cage journaled on said frame, a pinion for the driving shaft, a plurality of planet gears mounted in said cage and meshing with the pinion, clutch teeth rotatable with the cage, an internal ring gear meshing with said planet gears and shiftable axially, clutch dogs mounted on said frame, said ring gear having clutch means for engaging the clutch dogs on the frame and for cooperation with the clutch teeth movable with the cage.

21. In combination, means comprising a housing, a driving shaft, a driven shaft, an intermediate pinion carrier, planet idler pinions supported by said carrier, an external gear member surrounded by and meshing with said idlers, an internal gear member surrounding said idlers and meshing therewith, stationary clutch elements on said housing, clutch means on the pinion carrier, one of said gear members having constant driving connection with the driving shaft for imparting the drive therefrom, means for clutching the other of said gear members to said stationary clutch elements for a change speed drive from the driving shaft to the driven shaft through the intermediacy of the other gear member and said planet pinions and for clutching said gear member to the planet pinion carrier for direct drive between said shafts, and means fulcrumed for swinging movement on the housing and operable to impart axial sliding movement to said clutch means.

22. In combination, a cage having a plurality of idlers, a first shaft section having a pinion meshing with the idlers, a movable internal gear meshing with the idlers, a second shaft section, optionally releasable means to connect said cage and second shaft section to rotate in unison, means to hold said internal gear stationary, and means to move said internal gear to connect it with the cage and the second shaft section, and means to hold said cage stationary, said releasable means being released when said cage holding means is actuated.

23. In combination, a frame, a driving shaft and a cage journaled on said frame, a pinion for the driving shaft, a plurality of planet gears mounted in said cage and meshing with the pinion, a driven member and means constrainining it to move with the cage, an internal ring gear meshing with said planet gears and shiftable axially, clutch dogs mounted on said frame, said ring gear having clutch means for engaging the clutch dogs on the frame, and means on the driven member and adapted to operatively connect the ring gear with the cage.

In witness whereof, I hereunto subscribe my name this 12th day of December, 1925.

THOMAS L. FAWICK.